(12) United States Patent
Suereth et al.

(10) Patent No.: US 7,912,867 B2
(45) Date of Patent: Mar. 22, 2011

(54) SYSTEMS AND METHODS OF PROFILING DATA FOR INTEGRATION

(75) Inventors: Russell Suereth, Hewitt, NJ (US); William Ennis, West Milford, NJ (US); Gerard Clavens, Bethlehem, PA (US)

(73) Assignee: United Parcel Services of America, Inc.

( * ) Notice: Subject to any disclaimer, the term of this patent is extended or adjusted under 35 U.S.C. 154(b) by 476 days.

(21) Appl. No.: 12/036,611

(22) Filed: Feb. 25, 2008

(65) Prior Publication Data

US 2009/0216717 A1    Aug. 27, 2009

(51) Int. Cl.
   *G06F 7/00*    (2006.01)
(52) U.S. Cl. ........................................ 707/802; 707/811
(58) Field of Classification Search .................. 707/776, 707/615, 609, 758, 790, 802, 811; 715/854, 715/744
   See application file for complete search history.

(56) References Cited

U.S. PATENT DOCUMENTS

| | | | |
|---|---|---|---|
| 5,613,058 A * | 3/1997 | Koppolu et al. ............... | 715/744 |
| 7,010,515 B2 * | 3/2006 | Nakano ........................ | 707/776 |
| 7,167,877 B2 * | 1/2007 | Balogh et al. ................. | 707/615 |
| 7,177,856 B1 * | 2/2007 | Mancuso ............................... | 1/1 |
| 7,657,485 B2 * | 2/2010 | Daidone et al. ................. | 705/40 |
| 2003/0084075 A1 * | 5/2003 | Balogh et al. ................. | 707/204 |
| 2004/0133488 A1 * | 7/2004 | Daidone et al. ................. | 705/34 |
| 2005/0240592 A1 | 10/2005 | Mamou et al. | |
| 2005/0256892 A1 * | 11/2005 | Harken ........................ | 707/101 |
| 2005/0256896 A1 | 11/2005 | Pfeifer et al. | |
| 2006/0004595 A1 | 1/2006 | Rowland et al. | |
| 2008/0005106 A1 * | 1/2008 | Schumacher et al. ............ | 707/6 |
| 2010/0070930 A1 * | 3/2010 | Thibault ....................... | 715/854 |

OTHER PUBLICATIONS

Key Features of Informatica Data Explorer, Jun. 12, 2008; http://www.informatica.com/products/data_explorer/data_profiling/default.htm.
Profiling: Calculating Return on Investment For Data Migration and Data Integration Projects; White Paper, http://www.informatica.com/downloads/infa_wp_roi_dataprofiling_6744_web.pdf.
Rodriguez, Sergio; Informatica Data Explorer; Understanding the Content, Quality, and Structure of All Your Enterprise Data http://www.informatica.com/downloads/infa_ds_ide_6709 web.pdf.
IBM Information Server information center; Jun. 12, 2008 http://publib.boulder.ibm.com/infocenter/iisinfsv/v8r0/index.jsp?.
WebSphere Information Analyzer, Version 8 http://publibfp.boulder.ibm.com/epubs/pdf/c1899020.pdf.
Data Profiling and Automated Cleansing Using Oracle Warehouse Builder 10g Release 2; Jun. 12, 2008 http://www.oracle.com/technology/pub/articles/rittman-owb.html.
DMReview. Com; Jun. 12, 2008; http://www.dmreview.com/article_sub.cfm?articleId=6156.
Examining Source Data Using Data Profiling; Jun. 12, 2008 http://www.oracle.com/technology/obe/10gr2_owb/10gr2_owb_extend/profiler/profiler.htm.
An Introduction to Real-Time Data Integration; Jun. 12, 2008; http://www.oracle.com/technology/pub/articles/rittman-odi.html?rssid=rss_otn_articles.
Data Profiling, Data Integration and Data Quality—The Pillars of Master Data Management; b.eye Business Intelligence Network™.

(Continued)

*Primary Examiner* — Hung T Vy
(74) *Attorney, Agent, or Firm* — Alston & Bird LLP

(57) ABSTRACT

The present invention is generally directed to systems and methods for gathering information about nonnative data, comparing nonnative data elements to information defining nonnative data, comparing native data elements to information defining native data, establishing transformation rules, and integrating the nonnative and native data.

9 Claims, 17 Drawing Sheets

OTHER PUBLICATIONS

Informatica Data Explorer; Understanding the True Nature of Your Data Sources.

IBM Information Server—Delivers next generation data profiling, analysis and monitoring through the new IBM WebSphere Information Analyzer module; IBM United States Announcement 207-043, dated Mar. 13, 2007.

Profiling: Take the first step toward assuring data quality; delivering information you can trust; Dec. 2006.

Semantic Data Integration for the Enterprise; An Oracle White Paper; Jul. 2007.

* cited by examiner

Corporate Meta Data Repository

Welcome:

| Finder | Categories | Set Profile | Profile Administration | Reports | Support |

Search Objects

Select a search object by 'Name'

| Search Object Name | Search Object Description |
|---|---|
| Application Acronyms | Acronym based on selected criteria |
| Business Rules | BUSINESS RULE based on selected criteria |
| Copybook | Copybooks based on selected criteria |
| Database | Databases based on selected criteria |
| Elements-ALL | Elements based on selected criteria |
| Elements-Business | Elements based on selected criteria that are only in BUSELE status |
| Elements-UPS | Elements based on selected criteria that are only in UPSELE status |
| Elements-Warehouse | Elements based on selected criteria that are only in UPSELE status |
| Elements-XML CmlCase | XML Elements based on selected criteria that are only in UPSELE status |
| JCL/PROC | JCL/PROC based on selected criteria |
| Program | Programs based on selected criteria |
| Tables/Views | Table and Views based on selected criteria |
| Term/Abbrev-Business | Term/keyword based on selected criteria only from BUSGLOSS status |
| Term/Abbrev-UPS | Term/keyword based on selected criteria |
| WSO Search Object | Webstation Option Administration |

FIG. 3

SMT_CUS_RL_CD → Shipment Customer Role Code

BIL_TER_TYP_CD → Billing Term Type Code

CRR_NA → Carrier Name

FIG. 4

Corporate Meta Data Repository

Welcome:

| Finder | Categories | Set Profile | Profile Administration | Reports | Support |

Search criteria for Elements -ALL     Execute Query   Find All

Select an attribute from the 'Attributes' list. Select an operator from the 'Operators' list. To negate an operator mark the 'Not' checkbox. In the 'Attribute Values' column, specify the values to search. Use 'And', 'Or', 'Not' to create compound search statements. The 'Search Criteria' box at the bottom allows you to edit or enter your own search criteria.

| Attributes | Operators | Attribute Values |
|---|---|---|
| Element Name<br>DB2 Column Name<br>Status<br>Version<br>Standing<br>source<br>Business Name | Begins With<br>Contains<br>Between<br>Equal<br>Less<br>Less or Equal<br>Greater<br>Greater or Equal | MANIFEST<br><br>Accept |

⦿ And  ○ Or  ☐ Not

Search Criteria:     Upper Case   Clear

BUSINESS_NAME LIKE '%MANIFEST%'

FIG. 5

Corporate Meta Data Repository

Welcome:

| Finder | Categories | Set Profile | Profile Administration | Reports | Support |

Query Result for Elements-ALL

Select the row for subsequent processing. Click the column headers to sort.

| Subordinate Search | Text Processing | Print Processing |

Go to page: << <1 2 3 4 5 6 7 > >>  Enter page: [  ] Go of 7     1 - 30 of 187 rows

| ELEMENT NAME | BUSINESS NAME | VER | DATA TYPE | LENGHT | DECIMAL | STATUS | STANDING | SOURCE | XML_FUL_NA | IN WW |
|---|---|---|---|---|---|---|---|---|---|---|
| AC-CPR-MNF-CD-IR | ACCOUNT COMPUTER MANIFEST CODE INDICATOR | 0 | CHAR | 1 | 0 | UPSELE | APPROVED | | AccountComputerManifestCodeIndicator | |
| AC-MNF-IR | ACCOUNT MANIFEST INDICATOR | 0 | CHAR | 1 | 0 | UPSELE | APPROVED | | AccountManifestIndicator | |
| AC-MNF-SWR-WRT-CD | ACCOUNT MANIFEST SOFTWARE AUTHOR TYPE CODE | 0 | CHAR | 1 | 0 | UPSELE | APPROVED | | AccountManifestSoftwareAuthorTypeCode | |
| AC-RGS-MNF-IR | ACCOUNT REGISTER COMPUTER MANIFEST INDICATOR | 0 | CHAR | 1 | 0 | UPSELE | APPROVED | | AccountRegisterComputerManifestIndicator | |
| AHO-MNF-CRT-DT | AUTHORIZED SHIPPING OUTLET MANIFEST CREATION DATE | 0 | DATE | 0 | 0 | UPSELE | APPROVED | | AuthorizedShippingOutletManifestCreationDate | |
| AHO-MNF-CRT-TM | AUTHORIZED SHIPPING OUTLET MANIFEST CREATION TIME | 0 | TIME | 0 | 0 | UPSELE | APPROVED | | AuthorizedShippingOutletManifestCreationTime | |
| AIR-CGO-MNF-IR | AIR CARGO MANIFEST INDICATOR | 0 | CHAR | 1 | 0 | UPSELE | APPROVED | | AirCargoManifestIndicator | |
| AMS-ERR-CD | AUTOMATED MANIFEST SYSTEM MESSAGE ERROR | 1 | CHAR | 3 | 0 | UPSELE | APPROVED | | AutomatedManifestSystemMessageErrorCode | |

FIG. 6

Corporate Meta Data Depository

| Home | Reports | Response Problems | User Guides / Docs / Forms | Metadata WSO |

DB2 Description Report

Table Element Report For
D101AA

Total Records: 1474

| Table Name | Element Name | Business Name | Description | Data Type | Len | Dec |
|---|---|---|---|---|---|---|
| TACACEX | AC-NR | ACCOUNT NUMBER | THE IDENTIFYING NUMBER OF A UPS CUSTOMER ACCOUNT. (A.K.A., "SHIPPER NUMBER"). **NOTE: ACCOUNT NUMBER IS CONSIDERED UNIQUE WORLD WIDE, BUT IT MUST BE ACCOMPANIED BY COUNTRY CODE AND ACCOUNT TYPE IN ALL DATA STRUCTURES. | CHAR | 10 | 0 |
| | AC-TYP-CD | ACCOUNT TYPE CODE | CODE REPRESENTING THE TYPE OF UPS CUSTOMER ACCOUNT. EXAMPLES OF VALUES: 01 = DAILY PICKUP 02 = DROP SHIPPER 03 = UPS CUSTOMER COUNTER | CHAR | 2 | 0 |
| | CNY-CD | COUNTRY CODE | CODE REPRESENTING A NATION-STATE DEFINED BY TOPOGRAPHY, CULTURE AND DESIGNATED BOUNDARIES. UPS FOLLOWS A GOVERNING BODY STANDARD NAMELY, ISO (INTERNATIONAL STANDARDS ORGANIZATION), ANOTHER GOVERNING BODY IATA (INTERNATIONAL AIR TRANSPORTATION ASSOCIATION) DOES NOT DEFINE COUNTRY CODES, BUT FOLLOWS ISO CONVENTIONS. NOTE: THERE ARE COUNTRIES THAT HAVE BEEN ADDED TO THE ISO LIST WITH UPS DEFINED COUNTRY CODES, E.G. JE = JERSEY AND GG = GUERNSEY. IT WAS NECESSARY TO IDENTIFY THESE TWO COUNTY SUBDIVISIONS OF THE UNITED KINGDOM AS INDIVIDUAL COUNTRIES TO SATISFY UPS BUSINESS REQUIREMENTS. THIS PROCEDURE IS ACCEPTABLE TO ISO, AS ISO MANUAL 3166 CONTAINS A SECTION LISTING AVAILABLE CODE VALUES FOR INDIVIDUAL USE. EXAMPLES OF VALUES: AT = ARGENTINA CA = CANADA DE = GERMANY BG = UNITED KINGDOM US = UNITED STATES OF AMERICA REFER TO THE WORLD WIDE CODES REPOSITORY FOR A LISTING OF STANDARD COUNTRY CODES. | CHAR | 2 | 0 |
| | SVC-PVR-NR | SERVICE PROVIDER NUMBER | THE IDENTIFYING NUMBER OF A SERVICE PROVIDE. A SERVICE PROVIDER IS AN PERSON WHO PROVIDES SERVICES ON BEHALF OF UPS TO INTERNAL OR EXTERNAL CUSTOMERS. SEE ALSO REVISE PROVIDER NAME (SVC-PVR-NA). | CHAR | 9 | 0 |
| | ROW-UDT-IR | ROW UPDATE INDICATOR | INDICATES WHETHER OR NOT THE RELATED TABLE ROW WAS UPDATED. VALID VALUES: 0 = TABLE ROW WAS NOT UPDATED 1 = TABLE ROW WAS UPDATED | CHAR | 1 | 0 |

FIG. 7

| DATABASE_NAME | TB_NAME | CREATOR | STATUS | TABLE_ENT_ID | ELEMENT_NAME | VERSION | BUSINESS_NAME | DATA_TYPE |
|---|---|---|---|---|---|---|---|---|
| D463MA | TFPIPLA | D463MA | ABR | 79493049 | BIL-TER-TYP-CD | 0 | BILLING TERM TYPE CODE | CHAR |
| D413AA | TBSHPT | D413AA | AS-BOOS | 21859597 | BIL-TER-TYP-CD | 0 | BILLING TERM TYPE CODE | CHAR |
| D413AA | TBBLTY | D413AA | AS-BOOS | 21857024 | BIL-TER-TYP-CD | 0 | BILLING TERM TYPE CODE | CHAR |
| D057AB | TVORGBT | D057AB | AS-FDC | 65141635 | BIL-TER-TYP-CD | 0 | BILLING TERM TYPE CODE | CHAR |
| D057AB | TVDSTBT | D057AB | AS-FDC | 65141618 | BIL-TER-TYP-CD | 0 | BILLING TERM TYPE CODE | CHAR |
| D057AB | TDKSURT | D057AB | AS-FDC | 5307320 | BIL-TER-TYP-CD | 0 | BILLING TERM TYPE CODE | CHAR |
| D057AB | TDKSURB | D057AB | AS-FDC | 5307223 | BIL-TER-TYP-CD | 0 | BILLING TERM TYPE CODE | CHAR |
| D057AB | TDKSTER | D057AB | AS-FDC | 5307170 | BIL-TER-TYP-CD | 0 | BILLING TERM TYPE CODE | CHAR |
| D057AB | TDKSTER | D057AB | AS-FDC | 5307170 | AC-BIL-TER-TYP-CD | 0 | ACCOUNT BILLING TERM TYPE CODE | CHAR |
| D057AB | TDKSMT | D057AB | AS-FDC | 5306913 | AC-BIL-TER-TYP-CD | 0 | ACCOUNT BILLING TERM TYPE CODE | CHAR |
| D057AB | TDKBLTM | D057AB | AS-FDC | 5305367 | AC-BIL-TER-TYP-CD | 0 | ACCOUNT BILLING TERM TYPE CODE | CHAR |
| D057AB | TDKBLTM | D057AB | AS-FDC | 5305367 | BIL-TER-TYP-CD | 0 | BILLING TERM TYPE CODE | CHAR |
| D059AA | TIOSHPT | D059AA | AS-IDORS | 1253398 | BIL-TER-TYP-CD | 0 | BILLING TERM TYPE CODE | CHAR |
| D261AA | TBILSVC | D261AA | BDC-CDC | 5907340 | BIL-TER-TYP-CD | 0 | BILLING TERM TYPE CODE | CHAR |
| D261AA | TCHTREL | D261AA | BDC-CDC | 5908312 | BIL-TER-TYP-CD | 0 | BILLING TERM TYPE CODE | CHAR |
| D261AA | TBILTER | D261AA | BDC-CDC | 5907362 | BIL-TER-TYP-CD | 0 | BILLING TERM TYPE CODE | CHAR |
| D261AA | THSMTDT | D261AA | BDC-CDC | 77911433 | BIL-TER-TYP-CD | 0 | BILLING TERM TYPE CODE | CHAR |
| D261AA | TESMTDT | D261AA | BDC-CDC | 5916467 | BIL-TER-TYP-CD | 0 | BILLING TERM TYPE CODE | CHAR |
| D524AA | TEBSHPA | D524AA | BES | 66910497 | BIL-TER-TYP-CD | 0 | BILLING TERM TYPE CODE | CHAR |
| D524AA | TEBSHIP | D524AA | BES | 66910064 | BIL-TER-TYP-CD | 0 | BILLING TERM TYPE CODE | CHAR |
| D413BR | TBRCSFR | D413DR | BISI | 39677760 | BIL-TER-TYP-CD | 0 | BILLING TERM TYPE CODE | CHAR |
| D101AA | TRTNSVC | D101AA | CARES | 19797944 | BIL-TER-TYP-CD | 0 | BILLING TERM TYPE CODE | CHAR |
| D101AA | TSMT | D101AA | CARES | 1244527 | ORL-BIL-TER-TYP-CD | 0 | ORIGINAL BILLING TERM TYPE CODE | CHAR |
| D101AA | TSMT | D101AA | CARES | 1244527 | BIL-TER-TYP-CD | 0 | BILLING TERM TYPE CODE | CHAR |
| D101AA | TBILTRM | D101AA | CARES | 1239363 | BIL-TER-TYP-CD | 0 | BILLING TERM TYPE CODE | CHAR |
| D055CD | TBLTTYP | D055CD | CCT | 14808385 | BIL-TER-TYP-CD | 0 | BILLING TERM TYPE CODE | CHAR |
| D260AA | TCLPSMT | D260AA | CLB | 25448381 | BIL-TER-TYP-CD | 0 | BILLING TERM TYPE CODE | CHAR |
| D833AA | TMKGXMP | D883AA | CRIS | 66097276 | BIL-TER-TYP-CD | 0 | BILLING TERM TYPE CODE | CHAR |
| D833AA | TCNTXMP | D883AA | CRIS | 25051742 | BIL-TER-TYP-CD | 0 | BILLING TERM TYPE CODE | CHAR |
| D213OD | TORLSMT | D213OD | EBA | 67320472 | BIL-TER-TYP-CD | 0 | BILLING TERM TYPE CODE | CHAR |
| D213OC | TORLSMT | D213OC | EBA | 67309477 | BIL-TER-TYP-CD | 0 | BILLING TERM TYPE CODE | CHAR |
| D213OB | TORLSMT | D213OB | EBA | 67298482 | BIL-TER-TYP-CD | 0 | BILLING TERM TYPE CODE | CHAR |
| D213AA | TAVDDET | D213AA | EBA | 75777131 | BIL-TER-TYP-CD | 0 | BILLING TERM TYPE CODE | CHAR |
| D213JB | TADJPDT | D213JB | EBA | 67217775 | BIL-TER-TYP-CD | 0 | BILLING TERM TYPE CODE | CHAR |

FIG. 9

| NAME | CREATOR | DATABASE_NA | TB_NAME | STATUS | TABLE_ENT_ID | Expr1006 |
|---|---|---|---|---|---|---|
| BILLING INSERTS (INSERTS) D822AA | D822AA | D822AA | TCBKREQ | INSERTS | 65110464 | BIL-TER-TYP-CD |
| BILLING INSERTS (INSERTS) D822AA | D822AA | D822AA | TCBKREQ | INSERTS | 65110464 | ORL-BIL-TER-TYP-CD |
| BROKERAGE ESRTVICES (BES) D524AA | D524AA | D524AA | TEBSHPA | BES | 66910497 | BIL-TER-TYP-CD |
| BROKERAGE ESRTVICES (BES) D524AA | D524AA | D524AA | TEBSHIP | BES | 66910064 | BIL-TER-TYP-CD |
| BROKERAGE INTEGRATED SYS INIT (BIDID) D413BR | D413BR | D413BR | TBRCSFR | BISI | 39677760 | BIL-TER-TYP-CD |
| BROKERAGE OPERATIONS SUPPORT SYS (BOSS) D413AA | D413AA | D413AA | TIBSHPT | AS-BOSS | 21859597 | BIL-TER-TYP-CD |
| BROKERAGE OPERATIONS SUPPORT SYS (BOSS) D413AA | D413AA | D413AA | TIBBLTY | AS-BOSS | 21857024 | BIL-TER-TYP-CD |
| CLOSED LOOP BILLING (CLB) D260AA | D260AA | D260AA | TCLPSMT | CLB | 25448381 | BIL-TER-TYP-CD |
| CONSOLIDATED DATA CAPTURE (BDC-CDC) D261AA | D261AA | D261AA | TESMTDT | BDC-CDC | 5916467 | BIL-TER-TYP-CD |
| CONSOLIDATED DATA CAPTURE (BDC-CDC) D261AA | D261AA | D261AA | THSMTDT | BDC-CDC | 77911433 | BIL-TER-TYP-CD |
| CONSOLIDATED DATA CAPTURE (BDC-CDC) D261AA | D261AA | D261AA | TBILSVC | BDC-CDC | 5907340 | BIL-TER-TYP-CD |
| CONSOLIDATED DATA CAPTURE (BDC-CDC) D261AA | D261AA | D261AA | TCHTREL | BDC-CDC | 5908312 | BIL-TER-TYP-CD |
| CONSOLIDATED DATA CAPTURE (BDC-CDC) D261AA | D261AA | D261AA | TBILTER | BDC-CDC | 5907362 | BIL-TER-TYP-CD |
| CONSOLIDATED DATA CAPTURE (IBDC-CDC) D264AA | D264AA | D264AA | THSMTDT | IBDC-CDC | 77867767 | BIL-TER-TYP-CD |
| CONSOLIDATED DATA CAPTURE (IBDC-CDC) D264AA | D264AA | D264AA | TESMTDT | IBDC-CDC | 25349926 | BIL-TER-TYP-CD |
| CORPORATE CODE TABLES (CCT) D055CD | D055CD | D055CD | TELTTYP | CCT | 14808385 | BIL-TER-TYP-CD |
| CUSTOMER ACTION RESPONSE SYS (CARES) D101AA | D101AA | D101AA | TSMT | CARES | 1244527 | BIL-TER-TYP-CD |
| CUSTOMER ACTION RESPONSE SYS (CARES) D101AA | D101AA | D101AA | TRTNSVC | CARES | 19797944 | BIL-TER-TYP-CD |
| CUSTOMER ACTION RESPONSE SYS (CARES) D101AA | D101AA | D101AA | TBILTRM | CARES | 1293363 | BIL-TER-TYP-CD |
| CUSTOMER ACTION RESPONSE SYS (CARES) D101AA | D101AA | D101AA | TSMT | CARES | 1244527 | ORL-BIL-TER-TYP-CD |
| CUSTOMER RESOURCE INFORMATION (CRIS) DB83AA | D883AA | D883AA | TMKGXMP | CRIS | 66097276 | BIL-TER-TYP-CD |
| CUSTOMER RESOURCE INFORMATION (CRIS) DB83AA | D883AA | D883AA | TCNTXMP | CRIS | 25051742 | BIL-TER-TYP-CD |
| ENTERPRISE BILLING ADJUSTMENTS (EBA) D213AA | D213AA | D213AA | TAVDDET | EBA | 75777131 | BIL-TER-TYP-CD |
| ENTERPRISE BILLING ADJUSTMENTS (EBA) D213JA | D213JA | D213JA | TADJPDT | EBA | 67197190 | BIL-TER-TYP-CD |
| ENTERPRISE BILLING ADJUSTMENTS (EBA) D213JB | D213JB | D213JB | TADJPDT | EBA | 67217775 | BIL-TER-TYP-CD |
| ENTERPRISE BILLING ADJUSTMENTS (EBA) D213JC | D213JC | D213JC | TADJPDT | EBA | 67244497 | BIL-TER-TYP-CD |
| ENTERPRISE BILLING ADJUSTMENTS (EBA) D213JD | D213JD | D213JD | TORLSMT | EBA | 67265077 | BIL-TER-TYP-CD |
| ENTERPRISE BILLING ADJUSTMENTS (EBA) D213OA | D213OA | D213OA | TORLSMT | EBA | 67287483 | BIL-TER-TYP-CD |
| ENTERPRISE BILLING ADJUSTMENTS (EBA) D213OB | D213OB | D213OB | TORLSMT | EBA | 67298482 | BIL-TER-TYP-CD |
| ENTERPRISE BILLING ADJUSTMENTS (EBA) D213OC | D213OC | D213OC | TORLSMT | EBA | 67309477 | BIL-TER-TYP-CD |
| ENTERPRISE BILLING ADJUSTMENTS (EBA) D213OD | D213OD | D213OD | TORLSMT | EBA | 67320472 | BIL-TER-TYP-CD |
| EXTERNAL PACKAGE LEVEL DETAIL (EPLD) D511AA | D511AA | D511AA | TRSHPMT | EPLD | 37646298 | BIL-TER-TYP-CD |
| FLEXIBLE CORE BILLING (FCB) D268AA | D268AA | D268AA | TPBBVOL | FCB | 22598339 | BIL-TER-TYP-CD |
| FLEXIBLE CORE BILLING (FCB) D268UE | D268UE | D268UE | TSMTDET | FCB | 37206222 | BIL-TER-TYP-CD |

FIG. 11

| | Entity Name | Attribute Rolename | UPS Column Name | Column Datatype | Freight Data Feed Element |
|---|---|---|---|---|---|
| 1 | | | | | |
| 2 | BILLING TERM TYPE - TBILCON (IN OPLD) | Billing Term Type Code | BIL_TER_TYP_CD | CHAR(3) | Billing Term Type Code |
| 3 | BILLING TERM TYPE - TBILCON (IN OPLD) | Billing Term Type Description Text | BIL_TER_TYP_DSC_TE | CHAR(35) | |
| 4 | CARRIER - TCRRCD (N|OOPS) | Carrier Code | CRR_CD | CHAR(4) | Carrier Code |
| 5 | CARRIER - TCRRCD (N|OOPS) | Carrier Name | CRR_NA | CHAR(30) | Carrier Name |
| 6 | CARRIER MOVEMENT STATUS TYPE | Movement Status Code | MVM_STS_CD | CHAR(3) | |
| 7 | CARRIER MOVEMENT STATUS TYPE | Movement Status Description Text | MVM_STS_DSC_TE | CHAR(35) | |
| 8 | BILLING TERM TYPE - TBILCON (IN OPLD) | Currency Code | CCY_CD | CHAR(3) | |
| 9 | CURRENCY TYPE - TOCYCD (IN ICOPS) | Currency Name | CCY_NA | CHAR(35) | |
| 10 | CUSTOMER IDENTIFICATION NUMBER TYPE (TCSIDTY) | Customer Identification Number Type Code | CUS_ID_NR_TYP_CD | CHAR(2) | |
| 11 | CUSTOMER IDENTIFICATION NUMBER TYPE (TCSIDTY) | Customer Identification Number Type Code Description Text | CUS_ID_NR_TYP_TE | CHAR(35) | |
| 12 | CUSTOMER SHIPMENT (TCSSHP) | Ups Company Customer Identification Hashed Number | UPS_CO_CUS_HSH_HR | VARCHAR(32) | |
| 13 | CUSTOMER SHIPMENT (TCSSHP) | Customer Identifier Number Information Source Type Code | CUS_ID_INF_SRC_CD | CHAR(2) | Customer "Identifier" Number Qualifier |
| 14 | CUSTOMER SHIPMENT (TCSSHP) | Shipment Customer Role Code | SMT_CUS_RL_CD | CHAR(2) | Customer Role Code |

FIG. 14

| | A | B | C | D | E | F | G |
|---|---|---|---|---|---|---|---|
| 1 | APPLICATION NAME & WORKSTATION NAME | ELEMENT NAME | TABLE NAME | APPLICATION ACRONYM | BUSINESS NAME | DATA TYPE | LENGTH |
| 2 | ACCOUNTS BASED RATING (ABR) D463AB | CCY-CD | TACARAI | ABR | CURRENCY CODE | CHAR | 3 |
| 3 | ACCOUNTS BASED RATING (ABR) D463AB | CCY-CD | TACNVP | ABR | CURRENCY CODE | CHAR | 3 |
| 4 | ACCOUNTS BASED RATING (ABR) D463AB | CCY-CD | TACARAI | ABR | COUNTRY CODE | CHAR | 2 |
| 5 | ACCOUNTS BASED RATING (ABR) D463AB | CCY-CD | TACMBW | ABR | COUNTRY CODE | CHAR | 2 |
| 6 | ACCOUNTS BASED RATING (ABR) D463AB | CCY-CD | TACNVP | ABR | COUNTRY CODE | CHAR | 2 |
| 7 | ACCOUNTS BASED RATING (ABR) D463AB | CCY-CD | TACNVPR | ABR | COUNTRY CODE | CHAR | 2 |
| 8 | ACCOUNTS BASED RATING (ABR) D463AB | CCY-CD | TACPFL | ABR | COUNTRY CODE | CHAR | 2 |
| 9 | ACCOUNTS BASED RATING (ABR) D463AB | CCY-CD | TACSFRT | ABR | COUNTRY CODE | CHAR | 2 |
| 10 | ACCOUNTS BASED RATING (ABR) D463AB | CCY-CD | TACSRTM | ABR | COUNTRY CODE | CHAR | 2 |
| 11 | ACCOUNTS BASED RATING (ABR) D463AB | CCY-CD | TACWASY | ABR | COUNTRY CODE | CHAR | 2 |
| 12 | ACCOUNTS BASED RATING (ABR) D463AB | CCY-CD | TCNYDWD | ABR | COUNTRY CODE | CHAR | 2 |
| 13 | ACCOUNTS BASED RATING (ABR) D463AB | CCY-CD | TCNYSVC | ABR | COUNTRY CODE | CHAR | 2 |
| 14 | ACCOUNTS BASED RATING (ABR) D463AB | CCY-CD | TCTMRCI | ABR | COUNTRY CODE | CHAR | 2 |
| 15 | ACCOUNTS BASED RATING (ABR) D463AB | CCY-CD | TCTMRCP | ABR | COUNTRY CODE | CHAR | 2 |
| 16 | ACCOUNTS BASED RATING (ABR) D463AB | CCY-CD | TCTMRCZ | ABR | COUNTRY CODE | CHAR | 2 |
| 17 | ACCOUNTS BASED RATING (ABR) D463AB | CCY-CD | TNVPDWO | ABR | COUNTRY CODE | CHAR | 2 |
| 18 | ACCOUNTS BASED RATING (ABR) D463AB | CCY-CD | TNVPOD | ABR | COUNTRY CODE | CHAR | 2 |
| 19 | ACCOUNTS BASED RATING (ABR) D463AB | CCY-CD | TNVPTR | ABR | COUNTRY CODE | CHAR | 2 |
| 20 | ACCOUNTS BASED RATING (ABR) D463AB | CCY-CD | TSHPIN2 | ABR | COUNTRY CODE | CHAR | 2 |
| 21 | ACCOUNTS BASED RATING (ABR) D463AB | REC-EFF-STT-DT | TACMBW | ABR | RECORD EFFECTIVE START DATE | DATE | 0 |
| 22 | ACCOUNTS BASED RATING (ABR) D463AB | REC-EFF-STT-DT | TACNVPR | ABR | RECORD EFFECTIVE START DATE | DATE | 0 |
| 23 | ACCOUNTS BASED RATING (ABR) D463AB | REC-EFF-STT-DT | TACSFRT | ABR | RECORD EFFECTIVE START DATE | DATE | 0 |
| 24 | ACCOUNTS BASED RATING (ABR) D463AB | REC-EFF-STT-DT | TACSRTM | ABR | RECORD EFFECTIVE START DATE | DATE | 0 |
| 25 | ACCOUNTS BASED RATING (ABR) D463AB | REC-EFF-STT-DT | TCNYDWD | ABR | RECORD EFFECTIVE START DATE | DATE | 0 |
| 26 | ACCOUNTS BASED RATING (ABR) D463AB | REC-EFF-STT-DT | TCNYSVC | ABR | RECORD EFFECTIVE START DATE | DATE | 0 |
| 27 | ACCOUNTS BASED RATING (ABR) D463AB | SVC-TYP-CD | TACARAI | ABR | SERVICE TYPE CODE | CHAR | 3 |
| 28 | ACCOUNTS BASED RATING (ABR) D463AB | SVC-TYP-CD | TACMBW | ABR | SERVICE TYPE CODE | CHAR | 3 |

SYSTEMS AND METHODS OF PROFILING DATA FOR INTEGRATION

FIELD OF THE INVENTION

To present invention generally relates to systems and methods for profiling native and nonnative data for integration.

BACKGROUND

Data profiling can provide extremely useful information about the underlying data. For example, data profiling can be used to: discover the quality, characteristics, and potential problems of data; catalog and analyze metadata and discover metadata relationships; and help understand and prepare data for integration. The profiling process typically includes collecting information, such as statistics (e.g., mean and median values) and values (e.g., maximum and minimum values), of the underlying data. In the past, data profiling was performed manually. That is, to profile data, data analysts typically "eye balled" the data and collected statistics and other information about the data as they reviewed it. Manually analyzing data is an extremely time-consuming and error-prone process. Thus, given the amount of data used by businesses today, the manual method of profiling quickly became impractical. In response to the need for more efficient means of data profiling, various vendors began to develop and commercialize data profiling applications and tools. For example, IBM® and Computer Associates® sell a variety of tools, such as software applications, that can be implemented to profile data. However, the tools and methods currently available do not provide a well-refined solution for profiling data for integration.

Merging businesses, streamlining departments, parent companies operating subsidiary entities, and the like have given rise to a need to integrate data from a variety of sources. For example, over the years, United Parcel Service of America, Inc. (UPS®), has acquired various entities. When UPS® acquires entities such as the Overnite Corporation, it has a compelling interest in making use of the data of the acquired companies. What makes data integration challenging is the fact that while two data sources may comprise similar data, the data sources likely reference, store, and interact with the data differently. Thus, integrating data from unique data sources has posed a challenge to data integration efforts. Therefore, a need exists for systems and methods that aid in efficiently and effectively gathering, comparing, documenting, creating, and storing information about the data being profiled for potential integration opportunities, and for actually integrating the data.

BRIEF SUMMARY

In general, embodiments of the present invention provide for systems and methods that aid in efficiently and effectively gathering, comparing, documenting, creating, storing information about data being profiled for potential integration opportunities and for actually integrating the data.

In accordance with one aspect, a method is provided for integrating nonnative data with native data. In one embodiment, the method may include: (1) receiving information defining nonnative data; (2) expanding the nonnative data element tokens; (3) searching native data to determine if information associated with any of the respective native data elements and information associated with any of the respective full nonnative data element names are similar; (4) importing the nonnative data; (5) identifying values of the nonnative data; (6) comparing the nonnative data to the information defining the nonnative data to determine if there are any discrepancies between the information defining the nonnative data and the nonnative data; (7) recording the discrepancies and determining if the information defining the nonnative data needs to be modified; (8) if necessary, modifying the information defining the nonnative data; (9) in response to a search determining that at least one native data element and one full nonnative data element name are associated with a similar type of information, receiving information defining the similar native data elements; (10) comparing the nonnative data to the information defining the similar native data elements to determine if there are discrepancies; (11) recording the discrepancies and determining if the information defining the native data needs to be modified; and (12) if necessary, modifying the information defining the similar native data elements.

In accordance with another aspect, a system is provided for integrating nonnative data with native data. In one embodiment, the system may include a processor configured to: (1) receive information about native data and nonnative data, including full nonnative data element names and native data elements; (2) search native data to determine if information associated with any of the respective native data elements and information associated with any of the respective full nonnative data element names are similar; (3) import the nonnative data; (4) identify values of the nonnative data; (5) record any discrepancies between the information defining the nonnative data and the nonnative data; (5) receive information defining the similar native data elements; and (6) record any discrepancies between the nonnative data to the information defining the similar native data elements.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 3 shows an exemplary embodiment of a way to access information defining data.

FIG. 4 shows exemplary data element tokens and their expanded data element names.

FIGS. 5-11 show exemplary steps and outputs of a name matcher module in an exemplary embodiment.

FIG. 14 shows exemplary input for a data element matcher module in an exemplary embodiment.

FIGS. 15 and 16 show exemplary reports generated by the data element matcher module in an exemplary embodiment.

DETAILED DESCRIPTION OF THE INVENTION

Figure 1:
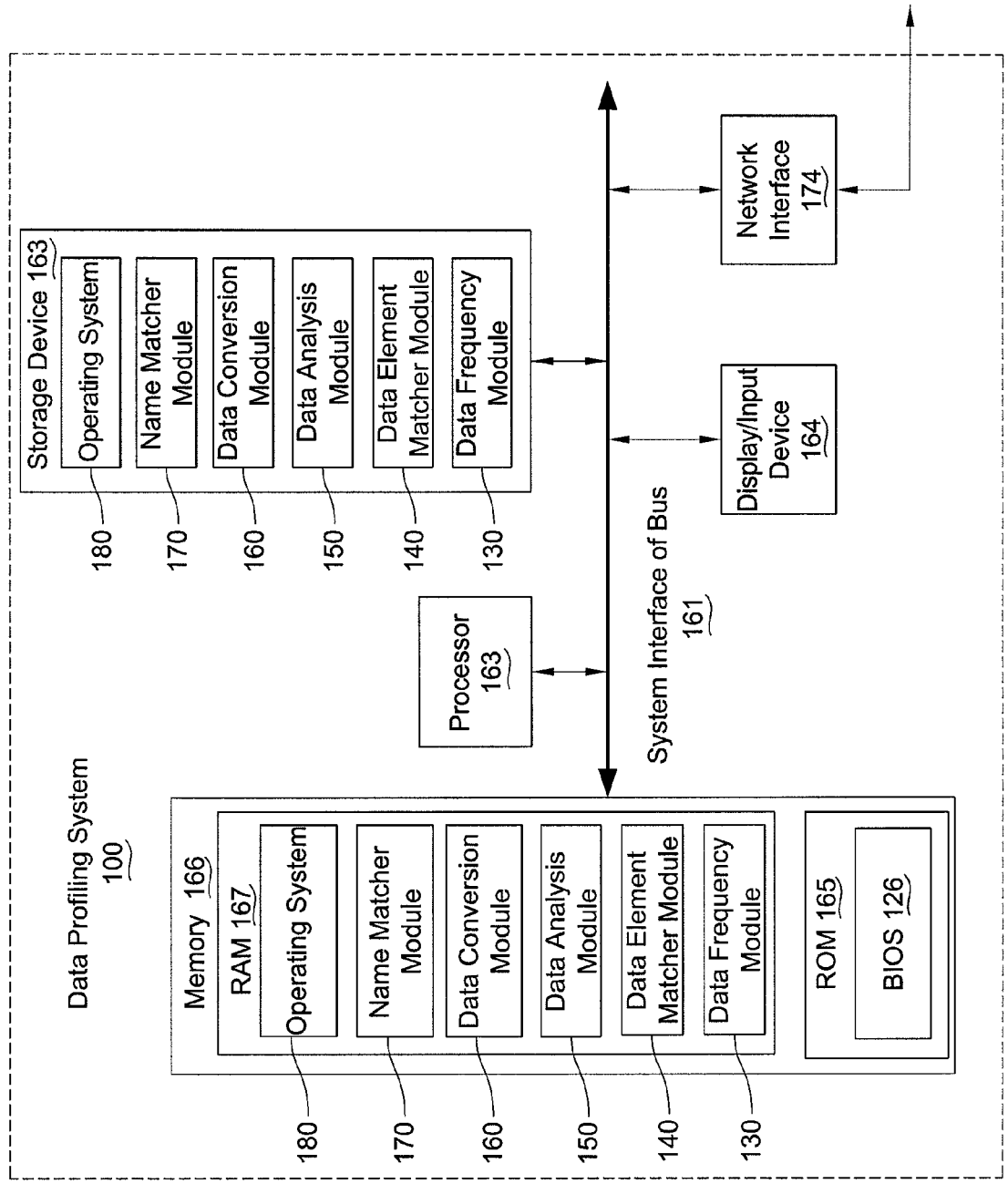
FIG. 1 shows an exemplary embodiment of a data profiling system.

The present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As should be appreciated, the exemplary embodiments may be implemented as methods, apparatus, network entities, systems, or computer program products. Accordingly, the exemplary embodiments may take the form of an entirely hardware embodiment, an entirely software embodiment, or an embodiment combining software and hardware aspects. Furthermore, the various implementations may take the form of a computer program product on a computer-readable storage medium having computer-readable program instructions (e.g., computer software) embodied in the storage medium. More particularly, implementations of the exemplary embodiments may take the form of web-implemented computer software. Any suitable computer-readable storage medium may be utilized including hard disks, CD-ROMs, optical storage devices, or magnetic storage devices.

The exemplary embodiments are described below with reference to block diagrams and flowchart illustrations of methods, apparatus, network entities, systems, and computer program products. It should be understood that each block of the block diagrams and flowchart illustrations, respectively, can be implemented by computer program instructions, e.g., as logical steps. These computer program instructions may be loaded onto a general purpose computer, special purpose computer, or other programmable data processing apparatus to produce a machine, such that the instructions which execute on the computer or other programmable data processing apparatus implement the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the functionality specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support various combinations for performing the specified functions, combinations of steps for performing the specified functions and program instructions for performing the specified functions. It should also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Exemplary Architecture

FIG. 1 shows a data profiling system 100 according to an exemplary embodiment. The phrase "data profiling system" is used generically to refer to any computer, mainframe, desktop, notebook or laptop, distributed system, network entity, gateway, router, server, hub, switch, repeater, or any other processing device configured to perform the functions described herein. As will be understood from FIG. 1, in this embodiment, the data profiling system 100 is connected to one or more networks (e.g., connected via a local area network (LAN), metropolitan area network (MAN), wide area network (WAN), the Internet, or private network) to communicate with other computing entities, including databases. This communication is typically executed using a wired data transmission protocol, such as X.25, ISDN, DSL, PIP, Ethernet, ATM, frame relay, DOCSIS, or any other wired transmission protocol. Similarly, the data profiling system 100 may be configured to communicate via wireless external communication networks using any of a variety of protocols. Also, the data profiling system 100 may be embodied in a distributed computing system. That is, the data profiling system 100 may be located remotely from any entity with which it communicates.

Alternatively, in another embodiment, the data profiling system 100 may reside on the same computer system as the entities with which it communicates via a network, system interface, or bus. In these embodiments, the data profiling system 100 may be located remotely from the databases it accesses or the systems with which it communicates. In yet another embodiment, the data profiling system 100 may implement the functionality described herein via modules, e.g., a name matcher module 170, a data conversion module 160, a data analysis module 150, a data element matcher module 140, and a data frequency module 130. As will be recognized, though, the architectures described herein are exemplary and not limiting to the various embodiments.

As mentioned, FIG. 1 shows one embodiment of the data profiling system 100 implementing the described functionality as modules. As will be understood from this figure, in this embodiment, the data profiling system 100 includes a processor 163 that communicates with other elements within the data profiling system 100 via a system interface or bus 161. The data profiling system 100 also includes a display/input device 164 for receiving and displaying data. This display/input device 164 may be, for example, a keyboard or pointing device used in combination with a monitor. The data profiling system 100 further includes memory 166, which may include both read only memory (ROM) 165 and random access memory (RAM) 167. The data profiling system's ROM 165 is used to store a basic input/output system 26 (BIOS), containing the basic routines that help to transfer information between elements within the data profiling system 100.

In addition, the data profiling system 100 may include a storage device 163, such as a hard disk drive, a floppy disk drive, a CD ROM drive, or an optical disk drive, for storing information on various computer-readable media, such as a hard disk, a removable magnetic disk, or a CD-ROM disk. As will be appreciated, each of these storage devices 163 may be connected to the system bus 161 by an appropriate interface. The storage devices 163 and their associated computer-readable media provide nonvolatile storage. The computer-readable media described above could be replaced by any other type of computer-readable media, e.g., magnetic cassettes, flash memory cards, digital video disks, and Bernoulli cartridges.

A number of program modules may be stored by the various storage devices and within RAM 167. Such program modules may include an operating system 180, a name matcher module 170, a data conversion module 160, a data analysis module 150, a data element matcher module 140, and a data frequency module 130. The name matcher module 170, data conversion module 160, data analysis module 150, data element matcher module 140, and data frequency module 130 control certain aspects of the operation of the data profiling system 100, with the assistance of the processor 163 and operating system 180. As discussed briefly, the modules implement various functions of the data profiling system 100;

however, the modules are not necessarily integrated or standalone modules. Thus, in some embodiments, the output from one module might require manual input into another module.

Also located within the data profiling system 100 is a network interface 174 for interfacing and communicating with other elements of a computer network. It will be appreciated that one or more of the data profiling system 100 components may be located remotely from other data profiling system 100 components. Furthermore, one or more of the components may be combined, and additional components performing functions described herein may be included in the data profiling system 100.

Brief Overview

In general, the exemplary embodiments of the present invention provide methods, apparatus, network entities, systems, and computer program products for profiling native data and nonnative data for integration possibilities. The meaning of the terms "native data" and "nonnative data" are a matter of perspective. For example, native data can be data that is internal to a primary source. Thus, nonnative data can be data that is external to the primary source. A primary source (native data) could be a record, column, table, database, department, company, a subsidiary, or the like. For instance, over the years, UPS has acquired various entities, such as the Overnite Corporation ("Overnite"). When UPS acquires entities such as Overnite, it typically has an interest in making use of the data of the acquired entities (e.g., nonnative data). In such cases, the nonnative data (Overnite's data) can be profiled for possible integration with the native data (UPS' data). As indicated though, the terms native data and nonnative data are used generically and can be used to represent data from one or more data sources, such as data from different departments, companies, or related business entities.

A. Nonnative Information Gathering

1. Gather Information Defining Nonnative Data

Figure 2:
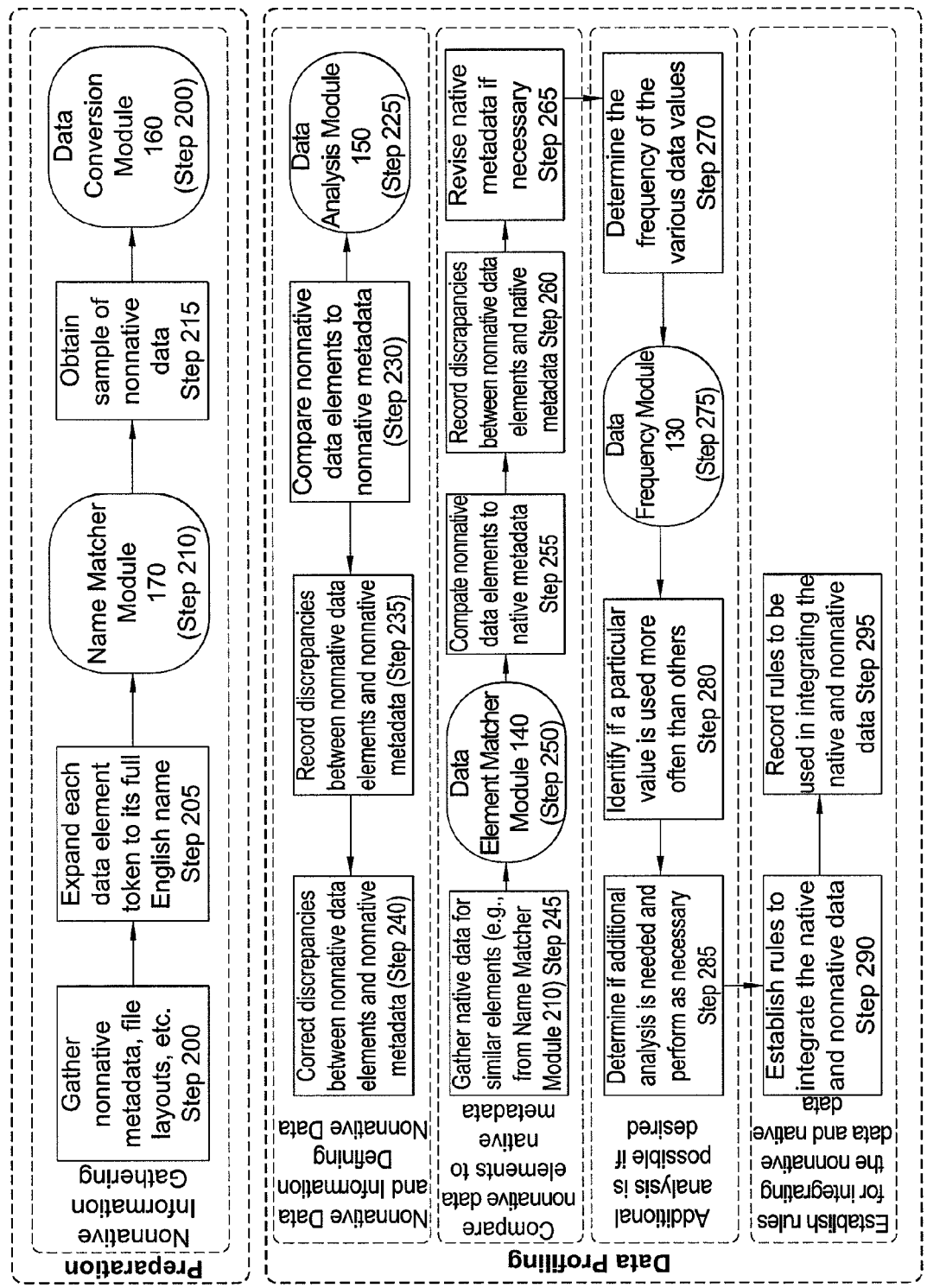
FIG. 2 shows an exemplary embodiment of steps for profiling data.

In one embodiment, the first step in profiling data is to identify the data source(s) and/or the nonnative data. As indicated in Step 200 of FIG. 2, after identifying the data sources and the nonnative data, analysts can begin to gather, import, and/or receive information defining the nonnative data, e.g., metadata. The terms gather, import, and receive are used generically to indicate that the information is somehow collected (hereinafter the terms are used interchangeably). For example, as shown in FIG. 3, the terms include retrieving the information, such as by accessing files containing the specified information stored in a repository. In this step, only information defining the nonnative data is typically gathered, but information defining the native data could be gathered as well. Information defining the nonnative data can also be acquired later, such as by the data analysis module 150 in Step 225 (FIG. 2). As should be recognized, information defining the native data can also be gathered if desired. Moreover, the type of information gathered can vary. For instance, in one embodiment, the information defining the data may include data dictionaries, metadata (tool-generated or home-grown), copybooks, table schemas, data models, common tables and contents, requirements documents, entity-relationship diagrams, process diagrams, or any other information defining the nonnative data.

2. Expand Nonnative Data Elements

After gathering information about the nonnative data, in one embodiment, the nonnative data element tokens (data element tokens, for example, are column names or table names) are expanded to their associated English meanings, respectively. That is, the data element tokens are expanded to their full nonnative data element names (Step 205 of FIG. 2). This can be referred to as "tokenizing." FIG. 4 and Table 1 provide an illustration of tokenizing:

TABLE 1

| | | |
|---|---|---|
| SMT_CUS_RL_CD | → | Shipment Customer Role Code |
| BIL_TER_TYP_CD | → | Billing Term Type Code |
| CRR_NA | → | Carrier Name |

In essence, expanding the data element tokens (e.g., SMT_CUS_RL_CD) facilitates understanding the data that is associated with each data element token (e.g., Shipment Customer Role Code). After expanding the data element tokens, the full nonnative data element names can be organized into meaningful groups. For example, each of the full nonnative data element names associated with billing information could be grouped together. In this example, the billing group could then be helpful in determining the scope of the billing information associated with the nonnative data. This is because all of the elements containing billing information would be associated with a single group. After grouping the elements, the full nonnative data element names can then be used to find native data elements associated with similar information as the nonnative data elements. For instance, the full nonnative data element names or words representing them can be used to query the native data to determine if any native data contains data elements associated with billing information. The query is an attempt to locate common, overlapping, or similar data between the native and nonnative data, e.g., searching for "like" elements. For example, if the term "manifest" were a common term in the grouping of the full nonnative data element names, it could be used as a search term in querying the native data. As should be recognized, the term or terms used to query the native data are not limited to group headings or the like; rather, the search term(s) may include some characteristic or attribute common to or representative of the full nonnative data element names. In one embodiment, this functionality can be implemented in a name matcher module 170.

Name Matcher Module

The name matcher module 170 can be used to match any native data elements associated with information that may be similar or related to the information associated with the full nonnative data element names (as shown in Step 210 of FIG. 2). In other words, the name matcher module 170 tries to match data elements in the nonnative data to like elements in the native data. By matching "like" names in the native data, the data analysis is refined. That is, the name matcher module 170 typically identifies a small subset of the native data that correlates to the various groupings of the full nonnative data element names. This matching streamlines the profiling process by decreasing the number of elements that actually need to be analyzed. The following paragraphs provide three exemplary embodiments implementing the name matcher module 170.

In one embodiment, the full nonnative data element names can be manually input into a web front-end to search the native data. For example, as shown in FIG. 5, "MANIFEST" can be an exemplary search term. In one embodiment, the results from the query would return the native data elements associated with the term manifest, as shown in FIG. 6. At this point, the results can then be exported to a program, such as Microsoft Excel (Excel) or Microsoft Access (Access), for matching the elements returned from the query to the full nonnative data element names. This subsequent matching can be performed, for example, manually by data analysts, with the aid of a spreadsheet program, or by an expert system.

In another embodiment a report generator can be used to generate a report containing all the native data elements. After generating the report, as shown in FIG. 7, the results can be exported to a program, such as Excel or Access. After exporting the results, the native data elements can be matched to the full nonnative data element names. This subsequent matching can be performed, for example, manually by data analysts, with the aid of a spreadsheet program, or by an expert system.

Figure 8:
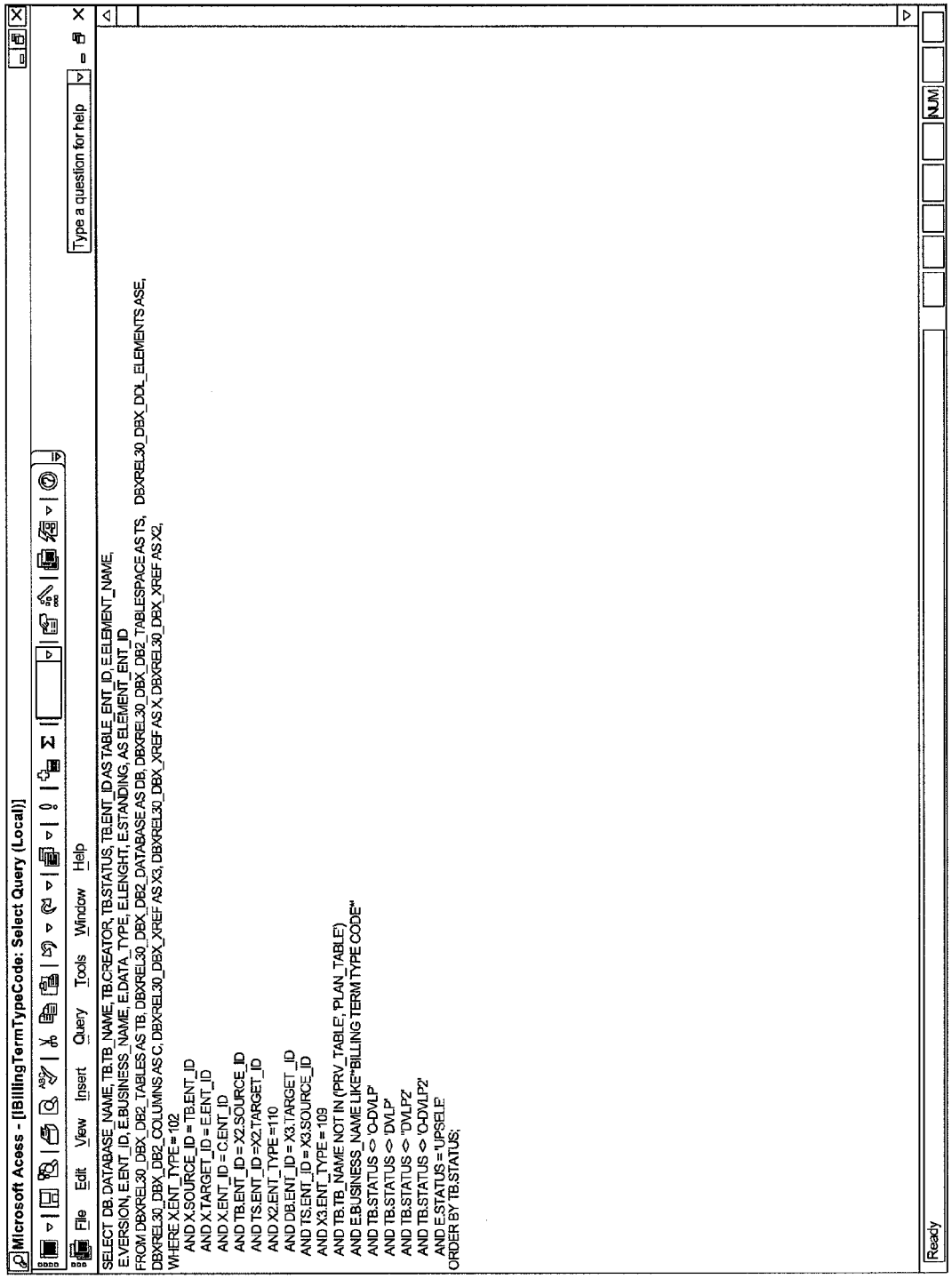
Figure 10:

In yet another embodiment, a batch report can be created by using standard SQL statements to search the native metadata repository of most any relational database to return all occurrences of a requested token string. For instance, a sample batch query searching for "BILLING TERM TYPE CODE" can be executed to return an initial set of data. An exemplary batch query is shown in FIG. 8. As mentioned, this type of query is typically run on multiple databases and/or tables and will return all occurrences of a requested token string, an exemplary output of which is shown in FIG. 9. The results provide valuable information for subsequent queries, so it is preferable to retrieve more information through the query than less. The results can then be exported to a spreadsheet program that can analyze the data, such as Excel, or analyzed manually by data analysts, with the aid of a spreadsheet program, or by an expert system. After analyzing the initial set of data, the results can be imported back into the program that executed the initial query and saved as a table that can then be used as input for subsequent queries, i.e., this step uses the initial set of data from the initial query to build a table for the subsequent queries. The saved table can then be used to further refine the data by executing additional queries, such as the one shown in FIG. 10, the results of which are shown in FIG. 11. In other words, this can further refine the data so that less data needs to be analyzed. The results can then be formatted and returned to analysts for further analysis. This subsequent analysis can be performed, for example, manually by data analysts, with the aid of a spreadsheet program, or by an expert system.

3. Obtain Nonnative Data

In one embodiment, the next step in profiling data is to obtain the actual nonnative data (Step 215 of FIG. 2). In this step, all of the data can be imported, although it is entirely possible to import only some of the nonnative data. One of the challenges of importing the nonnative data is the fact that the nonnative data may be in a different format than the native data. Thus, it is often necessary to convert the nonnative data as it is imported. By converting the nonnative data into a uniform format, it allows the nonnative data to be analyzed and profiled with greater success. This conversion can be executed via a data conversion module 160.

Data Conversion Module

As shown in Step 220 of FIG. 2, the data conversion module 160 can convert data into a particular format, e.g., the format of the native data. The data conversion can be implemented by in-house programs or off-the-shelf programs such as Access or IBM's DataStage. In one embodiment, files are viewed from the perspective of being an XML file or a non-XML file. With respect to simple non-XML files, for example, Access is very flexible in that it can convert several different types of data. This flexibility makes Access a good option for converting simple non-XML files. In some embodiments, Access can also be used to convert data in an XML format. For more complex files, programs such as DataStage might be used to convert the non-XML data and/or XML data, after which the converted data can be loaded into various programs for further manipulation. As should be recognized, the programs used for data conversion are exemplary and not limiting to the various embodiments described herein.

B. Compare Nonnative Data to Information Defining Nonnative Data

In one embodiment, after the nonnative data is converted to a particular format, its data elements are compared to the information defining the nonnative data. However, for analysts to compare the actual nonnative data values to the information defining the nonnative data, the actual values must first be obtained. This can be performed in a variety of ways: 1) the values can be obtained from sources external to the nonnative data, e.g., metadata, or 2) the values can be obtained from the nonnative data itself. Obtaining the values from sources external to the nonnative data provides useful information, although perhaps not the most accurate. Table 2 provides potential sources for the data values and is organized from the least-current sources to the most-current source.

TABLE 2

| Data Currency | Information Source |
|---|---|
| Least | Requirements Documents |
| Least | System Documentation |
| Medium - Most | Analyst Knowledge |
| Medium - Most | DCLGENS, Copybooks, Common Tables |
| Most | Data Analysis Module |

As indicated in Table 2, interrogating the data is the most accurate way to determine the contents of the data. In one embodiment, the data analysis module 150 provides this functionality, exemplary embodiments of which are discussed below.

Data Analysis Module

Figure 12:
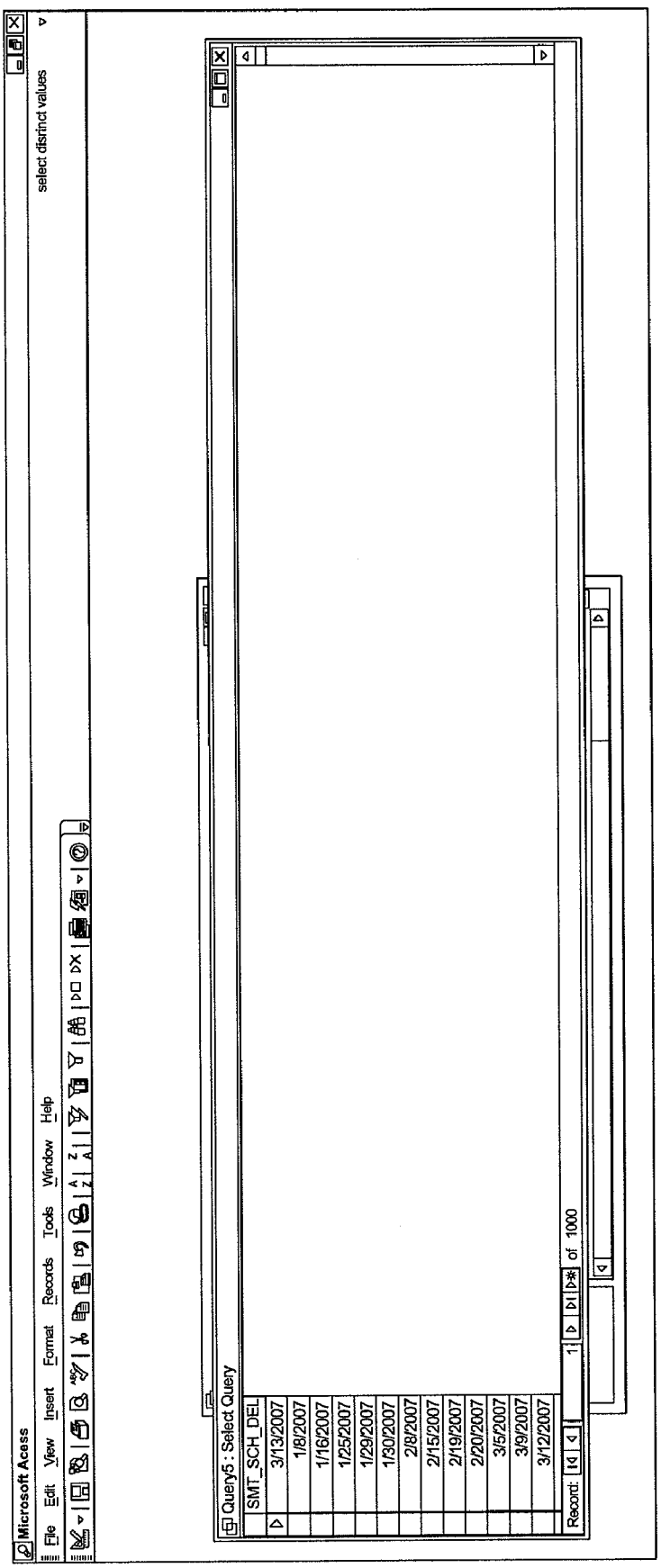
FIGS. 12 and 13 show exemplary steps and outputs of a data analysis module in an exemplary embodiment.
Figure 13:
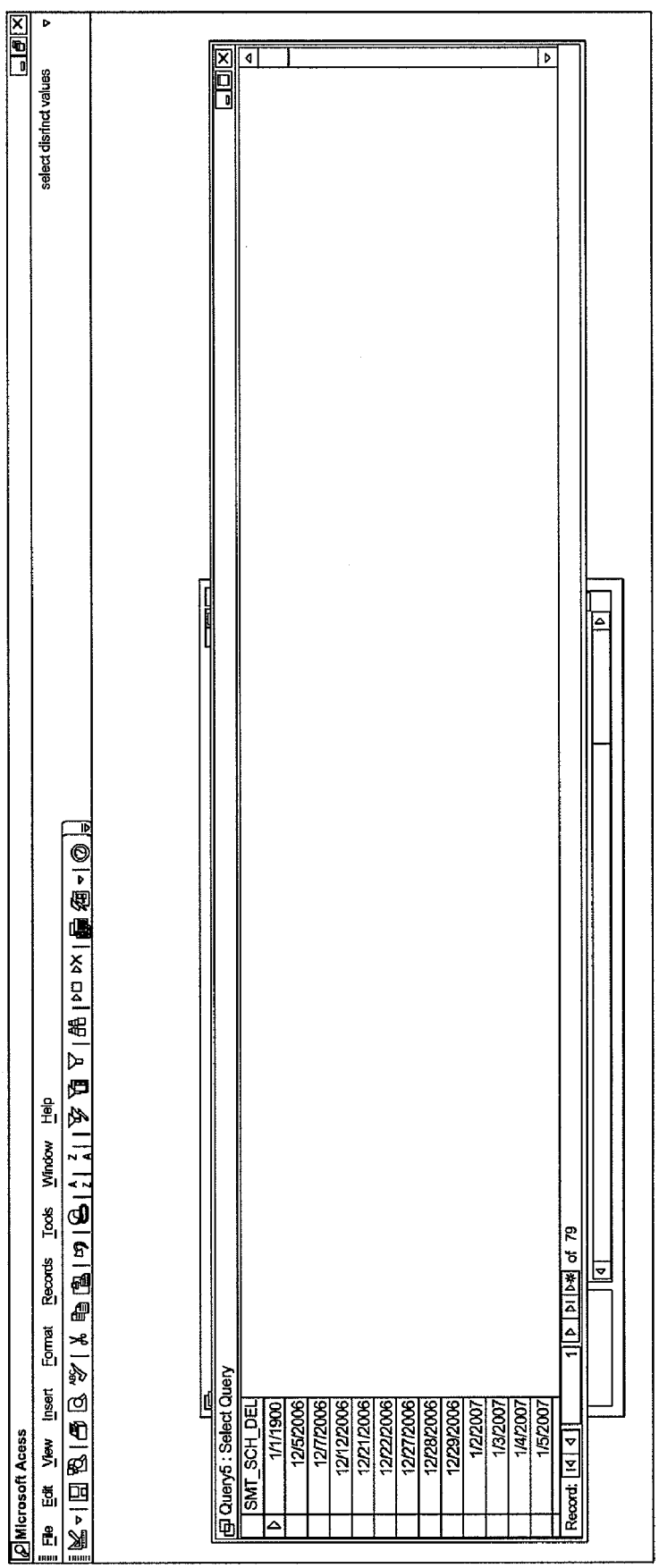

The data analysis module 150 typically provides the most accurate nonnative data values because it actually interrogates the data. In interrogating the data, the data analysis module 150 can perform functions such as first stage profiling, e.g., column profiling (Step 225 of FIG. 2). One of the principle functions of the data analysis module 150 is to determine the domain values, e.g., the range of values that occur in a column. There are a variety of specifically created SQL statements that implement the functionality of the data analysis module 150. As should be recognized, the statements can be written to identify all the possible unique values of the data elements within a column, table, or application. The results, e.g., the values, can then be returned to analysts for additional research. These queries 150 provide great insight to analysts reviewing the nonnative data, e.g., the results can be used to identify discrepancies between the nonnative data and the information defining it (e.g., metadata). Exemplary queries are shown in FIGS. 12 and 13. In the embodiment shown in FIG. 12, the data analysis module 150 executes a query that will return all values for a particular column, i.e., the query returns the value for every row in the column. As shown in FIG. 13, this query can also be executed to only return the unique values in a particular column. As mentioned, the results of the data analysis module can then be used to compare the nonnative data to the information defining the nonnative data.

1. Compare Nonnative Data Elements to Information Defining Nonnative

As mentioned, the data analysis module 150 provides analysts with information that they can use to compare to the nonnative data (Step 230 of FIG. 2). That is, in one embodiment, the analysts compare the output of the data analysis module 150 with the nonnative data to determine if there are any discrepancies between the two. This step helps analysts ensure that the information defining the nonnative data is accurate. The next step is to record any discrepancies.

2. Record Discrepancies between Nonnative Data and Information Defining Nonnative Data If there are discrepancies between the nonnative data and the information defining it, analysts can record the discrepancies, as indicated in Step 235 of FIG. 2. The term "record" is used generically and includes electronically storing, writing down, documenting, or otherwise creating a record identifying the discrepancies. In one embodiment, analysts record the values of what the nonnative data actually contains versus what the information defining the nonnative data indicates. By recording discrepancies, analysts can use the information to determine the quality of the data. For instance, this step can help analysts identify: (1) code values in the data not appearing in the existing documentation; (2) data truncation; and/or (3) data transformations not defined in the existing documentation. By identifying and recording discrepancies, analysts will then be in a position to correct them.

3. Correct Discrepancies between Nonnative Data and Information Defining Nonnative Data This step (Step 240 of FIG. 2) provides analysts with an opportunity to correct any discrepancies between the nonnative data and the information defining it. By reviewing the results of the data analysis module 150, analysts can then determine if any changes to the information defining the nonnative data need to be made. In one embodiment, for example, the corrections to the information defining the nonnative data might include: (1) additions and/or deletions to the domain set of codes and/or (2) updating business rules within the information defining the nonnative to reflect what the data reveals. At this point, analysts are typically in a position to understand the contents of the nonnative data to better evaluate possibilities for integrating the nonnative data with the native data.

C. Compare Nonnative Data Elements to Information Defining Native Data

1. Gather Information Defining Native Data

In one embodiment, the next step (Step 245 of FIG. 2) in profiling the data is to gather, import, or receive (hereinafter the terms are used interchangeably) information defining the native data. As mentioned previously, the information received can include data dictionaries, metadata (tool-generated or home-grown), copybooks, table schemas, data models, common tables and contents, requirements documents, entity-relationship diagrams, process diagrams, or any other information defining the nonnative data. Typically only information defining elements that are similar to or like the full nonnative data element names is received. This is because the similar elements are considered the "best candidates" for integration. In one embodiment, to determine the best candidates for integration and information about them, a data element matcher module 140 can be used. In this embodiment, the data element matcher module 140 uses the output from the name matcher module 170, which may have been further refined by analysts, as input.

Data Element Matcher Module

The data element matcher module 140 performs what is typically known as second and third stage profiling (Step 250 of FIG. 2). The data element matcher module 140 can receive a list of native candidate elements and return information that provides a context of how the data elements are used in the native data. For example, the results can show where a specific element is being used, how the data is being used in various applications, and any current and/or previous usages of the data. This enables analysts to further understand the scope of the information contained in the elements. The information can then be used to compare the uses and attributes of the native candidate elements to the nonnative data.

To do so, in one embodiment, the data element matcher module 140 generates an "Approved Elements Report" from a list of candidate elements. The list of candidate elements is typically received from the output/data of the name matcher module 170 that may have also been refined by analysts or received from other steps. An exemplary list of candidate elements is shown in FIG. 14. In one embodiment, this input is used to generate an Approved Elements Report. The Approved Elements Report typically only contains information of approved or active native data elements. An exemplary Approved Elements Report is shown in FIG. 15. The report indicates: (1) applications where elements are used; (2) element names; (3) tables in each application where elements are used; (4) acronyms of the applications; (5) business names of each element; (6) data types; and (7) lengths of the element. This information is extremely valuable to analysts to help identify other native applications where the data is being used and to evaluate how the data is being used. This information can then be compared to the use and attributes of the nonnative data.

In one embodiment, the data element matcher module 140 can also generate an "Obsolete to Approved Association Report." The Obsolete to Approved Association Report contains similar information as the Approved Elements Report, but may also contain information of data elements that are no longer recognized as active or approved but that are still being used by some applications. The Obsolete to Approved Association Report can also display the relationships between the obsolete elements and the active or approved elements. To generate this report, the data element matcher module 140 also needs a list of "candidate elements." As mentioned, the input of candidate elements is typically received from output/data of the name matcher module 170 that may have also been refined by analysts or received from other steps. An exemplary list of candidate elements is shown in FIG. 14. In one embodiment, this input is used to generate the Obsolete to Approved Association Report, an exemplary report is shown in FIG. 16. The report indicates the: (1) applications where elements are used; (2) tables in each application where elements are used; (3) acronyms of the applications; (4) obsolete element names; (5) active element names; (6) business names of each element; (7) data types; and (8) lengths of the elements. This information also provides a context of how the data elements are being used, which can be compared to the use and attributes of the nonnative data. As mentioned, by generating this additional report, an additional level of finding potential matches for integration can be achieved. Once this information is available, the list of native candidate elements can be created and the information defining these native data elements can be compared to the nonnative data elements.

2. Compare Nonnative Data Elements to Information Defining Native Data

The data element matcher module 170 provides analysts with a list of elements and information about how and where the elements are used. Analysts can compare the information defining the native data elements from the data element matcher module 140 to the nonnative data elements, as indicated in Step 255 of FIG. 2. The goals of this step are to: (1) identify the differences between the information defining the native data and the nonnative data elements and (2) finalize the list of native candidate elements for integration with the nonnative data. By comparing the information to the nonnative data, analysts can determine if there are any discrepancies between the nonnative data and the information defining the native data.

3. Record Discrepancies between Nonnative Data and Information Defining Native Data In one embodiment, the next step (Step 260 of FIG. 2) is to record any discrepancies between the nonnative data and the information defining the native data. As previously indicated, the term "record" is used generically and includes electronically storing, writing down, documenting, or otherwise creating a record identifying the discrepancies. By recording the discrepancies between the nonnative data and the information defining the native data, analysts will then be in a position to correct the discrepancies between them.

4. Correct Discrepancies in Information Defining Native Data

Identifying the discrepancies can assist analysts in making decisions concerning how to modify the information defining the native data, such as (1) revising the information defining the native data by, for example, expanding the information to include the nonnative data meanings; (2) extending the existing domain values to include examples of nonnative data values; and/or (3) establishing nonnative data transformation rules (Step 265 of FIG. 2). At this point, the nonnative data and data can be integrated, rules can be established for integration, and/or additional profiling can be performed.

D. Additional Data Profiling Analysis

In one embodiment, additional data profiling analysis can be performed on the nonnative data, although in some cases this step is unnecessary. If additional analysis is performed, it is typically done to provide a level of data analysis beyond that of profiling the data contained in a column, table, and application, e.g., it may provide data frequency information of specific elements. The data frequency information can be very useful, for example, in evaluating data trends, such as the overuse of null or default values.

1. Determine Frequencies of Nonnative Data Values

In one embodiment, analysts use additional profiling tools to perform frequency data analysis on the nonnative data. Understanding the number of times a specific value occurs in a set of data can provide useful information to analysts making integration decisions (Step 270 of FIG. 2). For instance, a high frequency of null or default values may indicate that the application is not enforcing its population or default values. Determining the frequency of various values can be performed by data integration tools, such as the data frequency module 130.

Data Frequency Module

Figure 17:
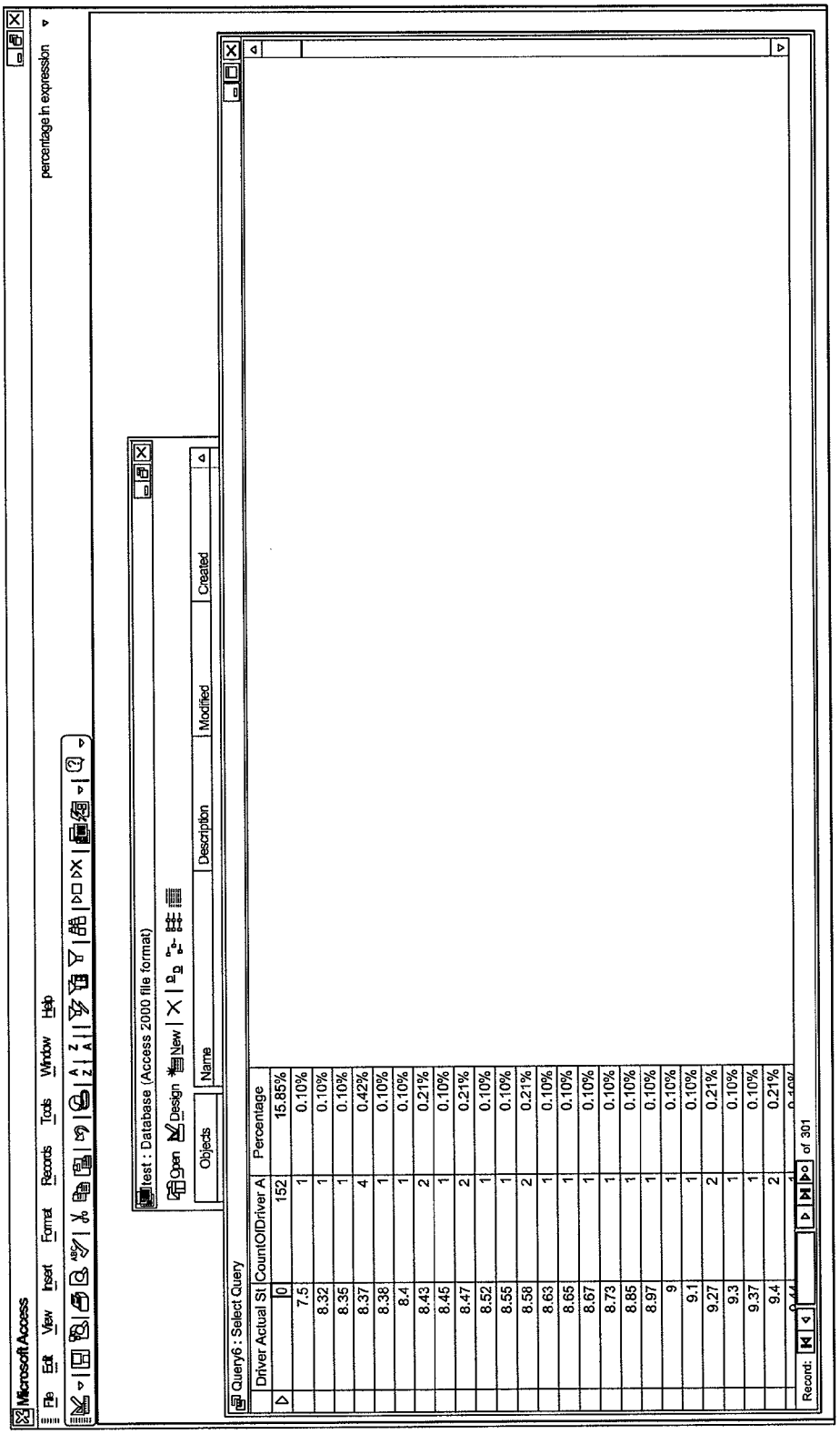
FIG. 17 shows an exemplary output of a data frequency module in an exemplary embodiment.

To determine various frequencies, the data frequency module 130 typically receives input from analysts, such as nonnative element names, values, tables, and/or columns (Step 275 of FIG. 2). The data frequency can then profile the data (1) within column; (2) within table; (3) and/or across all tables in the application. These levels build on each other with regard to identifying all of the possible places a specific element and its contents can be found as well as how frequently the values appear within a column, table, or application. An exemplary output is shown in FIG. 17. In FIG. 17, the first column shows the unique values, the second column shows the number of times the values occur in the column, and the third column shows the frequency percentage of the values in the column. The results from the data frequency module 130 can then be saved or otherwise recorded for use by analysts.

2. Identify Frequency of Values

In one embodiment, once the data frequency module 130 generates output, analysts can review the information (Step 280 of FIG. 2). For instance, analysts can determine if the frequency of a particular value of an element is higher or lower than expected. This step might require that the analysts have additional knowledge about the data, for example, knowledge as to why a particular value might be present at an increased frequency (e.g., a common customer type, country code, or commodity). There may, in fact, be valid business reasons for a high or low frequency of a given value. Thus, in analyzing the data, analysts often have questions that require additional research or consultation with others.

3. Determine if Additional Analysis is Needed/Ask Business Questions

As previously mentioned, analyzing the data frequency can lead to additional questions and/or research (Step 285 of FIG. 2). For example, the data frequency may give rise to questions such as (1) how the data is populated at the point of capture or (2) what type of editing should be done to prevent a high frequency of default or null values. Some of the questions might not be answerable by the analysts performing the data profiling. Thus, some of the questions or issues raised can be given to others, such as business units, to answer and/or solve. At this point, the nonnative data and data can be integrated and/or rules can be established for integration.

E. Rules for Integrating Native Data and Nonnative Data

After the data is analyzed, the profiling can be considered complete. However, in one embodiment, there are additional steps considered as being part of the integration process. The additional steps aid in the actual integration of the native and nonnative data.

1. Establish Rules for Integrating Native Data and Nonnative Data

In one embodiment, establishing transformation rules is an important part of the data integration process (Step 290 of FIG. 2). For instance, transformation rules can be used for: (1) code value translation; (2) truncation or elongation of fields; (3) numeric to alphabetic conversion and vice versa; and/or (4) region and/or organization translation. The transformation rules can be created in concert with business knowledgeable resources associated with both the native and nonnative data to ensure proper translation and integration.

2. Record Rules for Integrating Native Data and Nonnative Data

As indicated, one of the final steps of the process is to record the established transformation rules (Step 295 of FIG. 2). That is, the transformation rules established in the previous step, e.g., Step 290, are recorded. As mentioned, the term "record" is used generically and includes electronically storing, writing down, documenting, or otherwise creating a record of the established rules. In one embodiment, analysts store the transformation rules electronically such that they can be used by a population tool, e.g., an ETL (extract, transform, and load) tool, to integrate the data. The established transformation rules can also be recorded with the information recorded in Steps 235 and 260, i.e., with the information defining the native data and/or the information defining the nonnative data. At this point, the native data and nonnative data can be integrated.

In the preceding specification, various embodiments have been described. It will, however, be evident that various modifications and changes may be made thereunto without departing from the broader spirit and scope of the embodiments as set forth in the claims that follow. In fact, many of the embodiments are described as steps; however, the order of the steps described is not necessarily the order in which the steps are performed. That is, the order of the steps may vary and still be within the scope of the various embodiments of the present invention. Moreover, some of the steps can be omitted and That which is claimed:

1. A method for integrating nonnative data with native data comprising:
   receiving, via a computing device, information defining nonnative data;
   expanding nonnative data element tokens to their respective full nonnative data element names;
   searching native data, via a computing device, to determine if information associated with any of the respective native data elements and information associated with any of the respective full nonnative data element names are similar;
   importing the nonnative data via a computing device;
   identifying values of the nonnative data via a computing device;
   comparing the nonnative data to the information defining the nonnative data to determine if there are any discrepancies between the information defining the nonnative data and the nonnative data;
   in response to a determination that there are discrepancies between the nonnative data and the information defining the nonnative data, recording the discrepancies and determining if the information defining the nonnative data needs to be modified;
   in response to a determination that the information defining the nonnative data needs to be modified, modifying the information defining the nonnative data;
   in response to a search determining that at least one native data element and one full nonnative data element name are associated with a similar type of information, receiving information defining the similar native data elements;
   comparing the nonnative data to the information defining the similar native data elements to determine if there are discrepancies;
   in response to a determination that there are discrepancies between the nonnative data and the information defining the similar native data elements, recording the discrepancies and determining if the information defining the native data needs to be modified; and
   in response to a determination that the information defining the native data needs to be modified, modifying the information defining the similar native data elements.

2. The method of claim 1 further comprising:
   combining the nonnative data with the native data via a computing device.

3. The method of claim 1, wherein importing the nonnative data further comprises converting the nonnative data to a native format.

4. The method of claim 3, wherein the nonnative data is an XML format.

5. The method of claim 1 further comprising:
   determining the frequency of values in at least a column or table in the nonnative data via a computing device.

6. The method of claim 1 further comprising:
   establishing rules to combine the nonnative data with the native data.

7. The method of claim 6 further comprising:
   recording the rules used in combining the nonnative data with the native data.

8. The method of claim 6 further comprising:
   combining the nonnative data with the native data in accordance with the established rules via a computing device.

9. The method of claim 1, wherein comparing the nonnative data to the information defining the nonnative data further comprises obtaining the values associated with the respective data element tokens via a computing device.

* * * * *